United States Patent [19]
Hetzel

[11] 3,835,519
[45] Sept. 17, 1974

[54] METHOD OF MAKING LOW FRICTION MINIATURE GEAR DRIVE
[75] Inventor: Max Hetzel, Biel, Switzerland
[73] Assignee: Societe Suisse pour l'Industrie Horlogere Management Services SA, Bienne, Switzerland
[22] Filed: Nov. 6, 1973
[21] Appl. No.: 413,241

Related U.S. Application Data
[62] Division of Ser. No. 322,381, Jan. 10, 1973, Pat. No. 3,792,578.

[30] Foreign Application Priority Data
Feb. 28, 1972 Switzerland.................. 2806/72

[52] U.S. Cl...................... 29/177, 29/428, 29/434
[51] Int. Cl............................................. B23p 13/00
[58] Field of Search....... 29/159.2, 159 R, 177, 428, 29/434; 74/DIG. 4, 606; 58/7, 23 R, 23 A, 23 D, 23 V, 53, 54, 55, 125 R, 125 B

[56] References Cited
UNITED STATES PATENTS
2,603,103  7/1952  Sohon et al..................... 74/DIG. 4
2,820,471  1/1958  Crowell........................... 74/DIG. 4
2,882,592  4/1959  De Carbon.......................... 29/434
3,653,118  4/1972  Koivunen............................ 29/434

Primary Examiner—Charles W. Lanham
Assistant Examiner—V. A. Di Palma
Attorney, Agent, or Firm—Griffin, Branigan and Butler

[57] ABSTRACT

A miniature gear drive, such as that used in clockworks, is disposed in one chamber of a housing having two chambers interconnected by a capillary channel. The chamber containing the gears is sealed except for the channel, and the entire assembly immersed in a lubricant liquid within a vacuum chamber. The vacuum chamber is evacuated and then the vacuum removed so that the lubricant completely fills both chambers of the housing. The assembly is removed from the vacuum chamber and heated whereby the liquid expands and a portion of the liquid escapes through an opening in the second housing chamber. The assembly is then cooled so that an air bubble is formed in the second housing chamber, and the second chamber is then sealed. The input power to the gear drive, and the output power therefrom are obtained by magnetic coupling through the housing. The air bubble permits expansion of the liquid within the housing due to temperature changes, but the capillary channel prevents this bubble from reaching the chamber containing the gear drive hence the gears are always completely immersed in the liquid.

5 Claims, 5 Drawing Figures

METHOD OF MAKING LOW FRICTION MINIATURE GEAR DRIVE

This is a division, of U.S. Pat. application Ser. No. 322,381, filed Jan. 10, 1973 for A Low Friction Miniature Gear Drive For Transmitting Small Forces, and Method of Making Same now U.S. Pat. No. 3,792,578.

BACKGROUND OF THE INVENTION

The present invention concerns a low friction minature gear drive for transmitting small forces and for the reduction of a fast rotational movement, and a method for making a miniature gear drive.

Modern watches, such as tuning-fork watches, vibratory movement watches, quartz watches, and electronic watches in general, operate with relatively high vibration frequencies. In the vibratory motors of electric and electronic watches, a vibratory member comprises part of an electromagnetic oscillator which acts as a regulator for a clockwork, the resonance vibrations being maintained by an electric drive. In such vibratory motors the periodic motions are usually transmitted by means of a pawl mechanism acting on a ratchet wheel. The ratchet wheel provides for the rotary motion required to drive the dial hands. Operational frequencies of vibratory motors of the kind mentioned may be from approximately 200 to 1,000 cycles per second. The diameter of the ratchet wheel must be as small as possible and in prior art vibratory motors the diameter is typically approximately 1 to 3 mm. Accordingly, the possible number of teeth on the ratchet wheel is limited, thus requiring that the rotational velocity of the ratchet wheel be relatively high. To adapt the rotational motion of the ratchet wheel to the motion of the hands, a reduction drive must be provided, which on the first input stages operates with high speed. Experience has shown, that high speed leads to relatively high frictional losses which are not desirable for several reasons.

Vibratory motors are characterized by a relatively high inner energy and a low energy transmission to the outside. Therefore, generally only a relatively low drive power is available. For a wristwatch this drive power is on the order of a few microwatts. Therefore, even very small interferring forces can act back on the vibration system and be detrimental to the vibrations of the oscillator, which in turn will unfavorably influence the accuracy of running. High frictional forces also cause wear or destruction of the vibratory motor. The requirement that the transformation of the motion with as little friction as possible, and at a high efficiency, exists also because of the very limited space available for an energy source, for example a battery, and because of the desire not to exchange or charge the battery very often.

It is known from the teachings of mechanical engineering that a gear drive, in order to run with little friction, may be immersed in an oil bath. For this purpose, the gear drive is normally contained in a housing, filled to a large part with oil. However, in such a case the transmission of power from the outside to the gear drive, and vice versa, causes certain difficulties. Normally, gland sealings or shaft packings are provided which on one hand cause frictional losses and on the other hand never do provide an absolutely complete sealing. For small clockworks, such a gear drive is not suitable. In addition, on an incomplete filling of the gear box, irregularities in operation may occur, because, depending upon the orientation of the housing in space, all of the gears may not be completely immersed in the oil bath. On the other hand, it is not possible to fill the gear box completely with oil, because with an increase in temperature the oil expands more than the metal, so that the resulting forces might cause a rupture of the gear box. Vice versa, with a decrease in temperature, bubbles are created in a sealed gear box, which could unfavorably influence operation of the gear drive. In view of these difficulties no effort has been made to create for wristwatches a gear drive running in an oil bath. Other solutions have been used, which were especially directed to avoiding the necessity of a fast gear drive. For instance, the vibration frequency of the tuning fork watches has purposely been held low even though it has been recognized that this fails to make use of the possible greater accuracy available at higher tuning-fork frequencies.

BRIEF DESCRIPTION OF THE INVENTION

It is an object of the present invention to provide a fast and maintainance-free miniature gear drive with low frictional losses for transmitting small forces, especially on a large reduction ratio and small dimensions, whereby said gear drive is capable of being used in tuning-fork or quartz controlled clockworks, and especially in clockworks having a higher vibratory frequency than the presently used frequencies.

According to the present invention, this object is obtained by completely hermetically enclosing the gear drive in a housing filled with a liquid, and providing means whereby the power transmission to and/or from the gear train takes place magnetically through the wall of the housing so that the gear drive has extremely small frictional losses while transmitting small forces.

According to an embodiment of the invention, the minature gear drive comprises a housing including two chambers connected together by a channel, one chamber containing the gear train totally immersed in a liquid, and the other chamber serving as an expansion chamber for the liquid, the liquid in the expansion chamber containing a bubble.

The invention relates also to a method of making a miniature gear drive. This method comprises the steps of placing a housing with an open expansion chamber into a liquid, exposing the chamber and liquid to a high vacuum so that the air escapes, restoring normal pressure so that the liquid enters into the expansion chamber and a gear chamber, increasing the temperature and then again slightly reducing the temperature so that a bubble is formed in the expansion chamber, and then tightly sealing the opening of the expansion chamber to prevent gas leakage.

DESCRIPTION OF A PREFERRED EMBODIMENT

Figure 1:
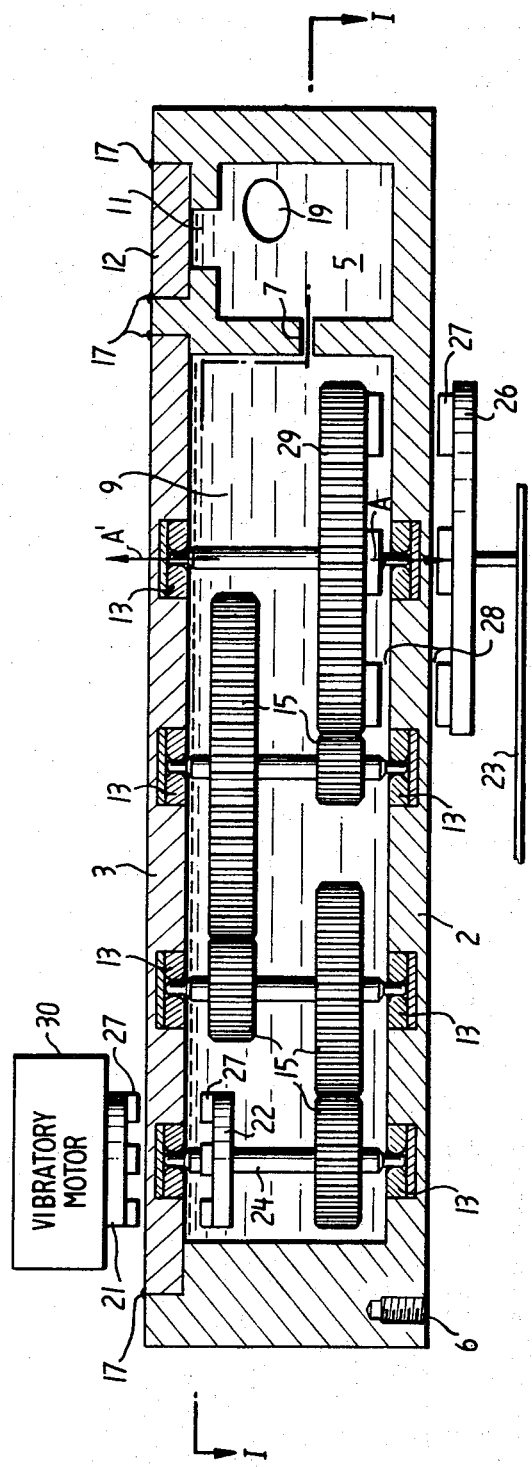
FIG. 1 is a part-sectional view through the miniature gear drive.
Figure 2:
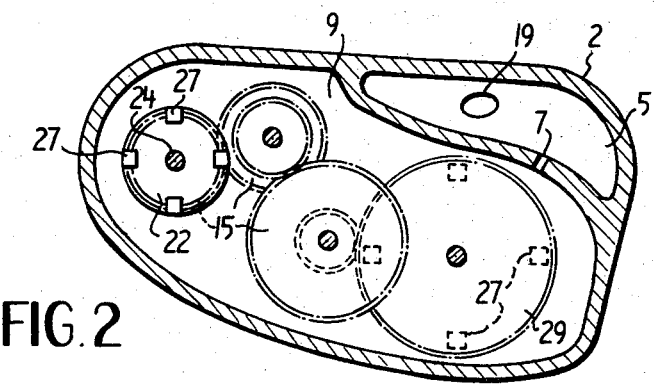
FIG. 2 is a schematic sectional top view taken generally along the line I—I of FIG. 1.

In a preferred embodiment of the invention illustrated in FIGS. 1 and 2, a miniature gear drive comprises a housing 1 receiving a gear train, which may be of conventional design, and the necessary parts for power transmission to and from the miniature gear drive. The housing 1 comprises a box-like part or box 2 and a cover 3. The box 2 can be an independent part provided with suitable fastening means 6 or a part of a suitably formed bottom plate of a clockwork. The housing 1 contains at least two chambers 9 and 5. The chamber 9 serves to receive the gear train, and the chamber 5 is an expansion chamber, which prevents the building-up of an excessive pressure in the interior of the housing or gear box. The expansion chamber 5 communicates with the gear chamber 9 by means of a small capillary channel 7. The cover 3 hermetically closes the gear chamber of the box 2. The hermetical closing can be obtained in any suitable way such as, for example, by glueing, soldering, squeezing in, cementing, or the like as indicated at 17. An adhesive particularily suitable for this purpose is a two-component adhesive, e.g. "Araldite" (Registered trademark). In like manner, a lid 12 (which may be ruby) is provided to sealingly cover the opening 11 of the expansion chamber 5. The expansion chamber 5 need not necessarily be near the gear chamber 9. In practice, geometrical space conditions can be considered in arranging the chambers 5 and 9, it only being necessary to provide for a communication between the chambers 5 and 9 by means of the channel 7, which is preferably capillary-like.

The cover 3 as well as the box 2 may be provided with bearings 13 to receive the drive gears 15 and 29 of the gear train. Preferably jewel bearings are used. For the use of the miniature drive on tuning-fork watches the gear train may be designed in the conventional way and may comprise approximately three or four pairs of gears, it being understood that the present invention is not limited to the specific gear train shown in FIGS. 1 and 2. When the ratchet-wheel 21 of the vibratory motor 30 is rotating with approximately four revolutions per second, a reduction of 1 to 240 is necessary to drive the hands of a watch, provided that the seconds-hand 23 is driven directly by the output of the gear drive. The minutes-hand and the hours-hand can then be driven by a known gear drive located outside of the miniature gear drive.

As shown in FIG. 1, power from a vibratory motor such as a tuning fork or quartz crystal controlled motor 30 is applied to the gear drive through ratchet-wheel 21, and the output from the gear drive may be obtained at A, or, alternatively, at A'. The power transmission to the gear drive and the power transmission from the gear drive takes place magnetically. The forces are transmitted without physical contact through the walls of the housing or box. For this purpose, the housing wall, through which magnetic power transmission takes place, must comprise a non-magnetic material. Power transmission takes place over clutch discs carrying at their peripheries magnetic elements 27. Depending on whether power transmission takes place axially or radially — as will be explained later — the clutch discs 21, 22 or 26, 29 of a clutch have the same or a different number of magnetic elements, respectively.

Figure 3:
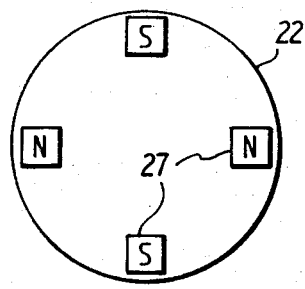
FIG. 3 shows an embodiment of a magnetic clutch disc with mounted magnetic elements.

The magnetic elements 27 may comprise, for example, Samarium-Cobalt ($SmCo_5$), and are mounted, as FIG. 3 shows, at the periphery of the respective clutch discs 21, 22, 26, and gear 29, so that the directions of magnetic orientation, as seen in direction of the periphery, alternate. The magnetic elements 27 have the form of small plates and are mounted by adhesives or other suitable means on the clutch discs 21, 22, 26 or on the gear 29 of the gear train.

Figure 4:
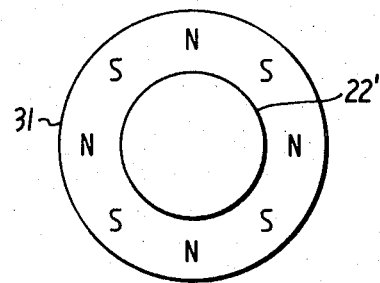
FIG. 4 shows an embodiment of a magnetic clutch disc with a magnetic ring mounted thereon.

According to another embodiment of the invention, illustated in FIG. 4 the coupling discs, or the gears acting as coupling discs, are provided instead with a magnetic ring 31 in place of the magnetic elements 27. The magnetic ring 31 has along its periphery zones of magnetization in opposite directions, i.e., north poles and south poles alternating. The magnetic ring has therefore the same function as the magnetic elements 27. A suitable ductile material capable of being shaped by stamping to form a ring is, for example, a platinum-cobalt-alloy. The magnetic elements 27 can be mounted on separate coupling discs 21, 22, 26 or directly on a gear. In the latter case the gear has the function of a coupling disc, as can be seen on gear 29 in FIG. 1. Both clutch elements, for instance coupling discs 21 and 22, or gear 29 and coupling disc 26, are located as close as possible to each other, so that a short magnetic flux path is obtained. As shown in FIG. 1, power transmission to the gear drive is obtained from the ratchet wheel 21 of the vibratory motor 30 through a coupling disc 22 facing the ratchet wheel, the cover 3 of the housing being between the wheel and the discs. The coupling disc 22 transmits the rotational motion to a pinion 24, and therefore to the gear train.

Figure 5:
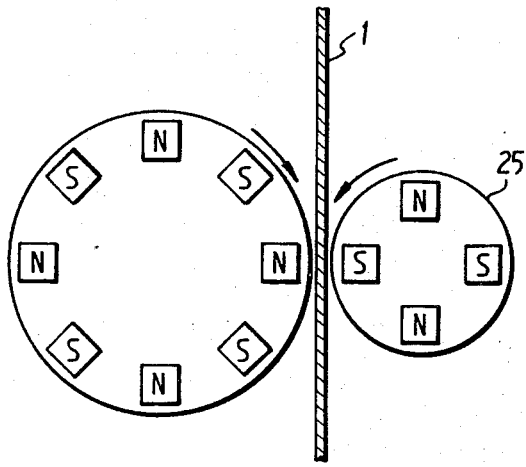
FIG. 5 shows the basic arrangement for radial magnetic power transmission.

The coupling of the rotational motion from the miniature gear drive is effected by the gear 29 provided with magnetic elements 27. The gear 29 couples the magnetic forces to the magnetic elements 27 on the adjacent coupling disc 26. From the coupling disc 26 the rotational motion is transmitted to the dial train as schematically indicated by the seconds-hand 23. In order to provide optimally efficient power transmission, the air gap 28 for the magnetic circuits should be kept as small as possible and the rotational axes of the two clutch elements should be co-axial or, in the case of radial power transmission, as parallel as possible. If the coupling discs, as shown in FIG. 1, are located in such a way, that they face each other, that is with aligned rotational axes, it is spoken of as an axial power transmission, because both elements of the magnetic clutch are moving normally with the same rotational velocity as if a rigid axis were connecting them. However, it is also possible to locate the two rotational axes parallel to each other at a distance, and to have the magnetic forces only active at the periphery of both coupling discs, as illustrated in FIG. 5. It is thereby possible to obtain a reduction or step-up in that different numbers of poles are provided. This is designated as radial power transmission.

After mounting all mechanical parts of the gear train in the housing, the chambers 5, 7, 9 are filled with a liquid. This liquid serves primarily as a lubricant for reducing friction losses of the fast rotating part of the gear drive, and to assure that the friction always remains the same. The hermetical sealing prevents dust or dirt from entering and increasing friction, and prevents inward leakage of environmental gases which might otherwise act on and destroy the lubricating qualities of the liquid. Servicing, such as cleaning, oiling or replacing of the liquid, is therefore obviated. A thin oil or other noncorrosive liquid such as petrol can be used as the lubricating liquid. As the gear chamber 9 is connected to the expansion chamber by a capillary channel 7, changes in the volume of the liquid which occur with temperature changes cannot be detrimental. These changes in the volume of the liquid may be an order of magnitude larger than the changes of the solid parts. In the expansion chamber there is a bubble 19 which becomes bigger or smaller as the temperature changes. Due to the small dimensions of the channel 7 the bubble 19 cannot enter into the gear chamber 9, because in the envisioned temperature region, which may extend for instance from $-10°$ to $+60°C$, the size of the occurring bubble is always smaller than the size of the expansion chamber 5, and because the small cross-section of the channel 7 prevents the bubble 19 from passing into the gear chamber 9, as would otherwise be the case, depending on the orientation in space, for a larger dimensioned channel.

The size of the gear chamber 9, the channel 7 and the expansion chamber 5 are dimensioned in such a way, that for a predetermined minimum temperature of e.g. $-10°$ C the bubble 19 has a substantially smaller volume than the expansion chamber 5, and that, on the other hand, on a temperature of $+60°$ C the expansion of the liquid decreases the bubble, but does not cause its complete disappearance, so that the bubble is practically a "crystallization core" on a renewed temperature drop, but cannot pass through the capillary channel 7. Due to the fact, that for all operating temperatures the gear chamber 9 is always completely filled with oil, it never happens that one or the other of the gears is running only partly in oil, which would create turbulences causing uneven or increased loads on the driving vibratory motor.

The method of filling the liquid into the miniature gear drive is accomplished as follows. The box 2 containing the gear chamber 9 with the gear train as well as the expansion chamber 5, after assembling all the gears and sealingly closing the cover 3, but not the opening 11, is immersed into a liquid contained in a vessel, and then the whole is evacuated in a vacuum chamber in approximately $10^{-2}$ torr, whereby the air contained in the gear chamber 9, the channel 7, and the expansion chamber 5 escapes. Thereafter, the vacuum is removed so that the gear chamber 9, the channel 7 and the expansion chamber 5 are filled with the liquid. Next, the housing is removed from the bath and the excess liquid cleaned therefrom by means of an absorbing material, such as, for example, blotting or filtrating paper. The entire assembly is then heated to a temperature which is somewhat above any temperature which the gear drive might be expected to encounter and still function, for instance 70° C. Therefore, the liquid contained in the gear chamber 9 and the expansion chamber 5 expands and escapes through the opening 11 to the exterior, and is absorbed by the filtrating paper. Afterwards, the whole assembly is cooled down to 60° C, whereby, on a corresponding contraction of the liquid in the chambers 9 and 5, a small bubble 19 is formed in the expansion chamber 5 by suction through the opening 11. The opening 11 is then closed by affixing the lid 12 so that the expansion chamber 5 and the gear chamber 9 are air-tight sealed from the exterior. The lid 12 may be affixed by any suitable means such as an adhesive 17. The adhesive, preferably a two-component adhesive, for instance "Araldite" (Registered Trademark) is then hardened at 60° C for the prescribed hardening time.

The embodiments of the invention in which an exclusive property or privilege is claimed are defined as follows:

1. The method of making a miniature gear drive comprising the steps of:
    mounting a gear train in the gear train chamber of a housing having a gear train chamber and an expansion chamber interconnected by a capillary channel, the chambers being open to ambient atmosphere;
    placing a cover in sealing position on said gear train chamber;
    immersing the housing in a liquid bath;
    subjecting the bath to a high vacuum to draw air out of said chambers;
    subjecting the bath to atmospheric pressure so that liquid from said bath fills said chambers;
    removing the housing from the bath and subjecting it to a temperature above ambient temperature whereby expansion of the liquid in the housing drives some of the liquid from the housing through the opening in the expansion chamber;
    cooling the housing slightly whereby contraction of the liquid in the housing draws an air bubble into the expansion chamber;
    and, sealing the opening in the expansion chamber.

2. The method as claimed in claim 1 wherein said high vacuum is approximately $10^{-2}$ torr.

3. The method as claimed in claim 1 wherein said cooling step comprises reducing the temperature about 10° C.

4. The method as claimed in claim 1 wherein said housing is subjected to a temperature of at least 40° C, and preferably 70° C after it is removed from said bath, said cooling step comprising reducing the temperature about 10° C.

5. The method as claimed in claim 3 wherein said opening in the expansion chamber is sealed with a ruby cover attached to the housing with a two-component adhesive, the entire assembly being maintained at the slightly reduced temperature until the adhesive has hardened.

* * * * *